(12) United States Patent
S et al.

(10) Patent No.: US 10,587,517 B2
(45) Date of Patent: *Mar. 10, 2020

(54) OPTIMIZING FABRIC PATH FORWARDING FOR VIRTUAL NODES WITHIN AN ELECTRONIC DEVICE

(71) Applicant: Juniper Networks, Inc., Sunnyvale, CA (US)

(72) Inventors: Vishnu Janardhanan S, Bangalore (IN); Babu Singarayan, San Jose, CA (US); Sayantani Gupta, Bangalore (IN); Arun G Menon, Bangalore (IN); Binu Shanmughan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/827,476

(22) Filed: Nov. 30, 2017

(65) Prior Publication Data

US 2019/0166050 A1 May 30, 2019

(51) Int. Cl.
*H04L 12/743* (2013.01)
*H04L 29/06* (2006.01)
(Continued)

(52) U.S. Cl.
CPC ...... *H04L 45/7453* (2013.01); *H04L 12/4641* (2013.01); *H04L 49/25* (2013.01); *H04L 69/22* (2013.01)

(58) Field of Classification Search
None
See application file for complete search history.

(56) References Cited

U.S. PATENT DOCUMENTS 5,550,816 A * 8/1996 Hardwick ........... H04L 12/4604
370/397
5,649,108 A * 7/1997 Spiegel ................... H04L 45/10
370/400

(Continued)

FOREIGN PATENT DOCUMENTS

EP 2946535 B1 8/2016

OTHER PUBLICATIONS

"IEEE Standard for Local and metropolitan area networks—Media Access Control (MAC) Bridges and Virtual Bridged Local Area Networks," IEEE Std 802.1Q-2011 (Revision of IEEE Std 802.1Q-2005), IEEE Computer Society, May 16, 2011, 49 pp.

(Continued)

*Primary Examiner* — Ayaz R Sheikh
*Assistant Examiner* — Tarell A Hampton
(74) *Attorney, Agent, or Firm* — Shumaker & Sieffert, P.A.

(57) ABSTRACT

The techniques describe directly forwarding a packet from an ingress packet forwarding engine to a particular destination packet forwarding engine (PFE) when internal packet load balancing may otherwise result in an increased number of fabric hops. For example, a source PFE may receive incoming packets destined for a router reachable only by a particular destination PFE (e.g., egress PFE). Rather than load balancing the incoming packets to a destination PFE that is likely to be a non-egress PFE, a source PFE obtains fabric path information associated with the egress PFE from a destination PFE such that source PFE may forward incoming packets directly to the egress PFE.

20 Claims, 5 Drawing Sheets

(51) Int. Cl.
*H04L 12/46* (2006.01)
*H04L 12/947* (2013.01)

(56) References Cited

U.S. PATENT DOCUMENTS

| | | | | |
|---|---|---|---|---|
| 5,784,597 | A * | 7/1998 | Chiu | H04J 1/12 370/252 |
| 6,104,696 | A * | 8/2000 | Kadambi | H04L 49/351 370/218 |
| 6,577,600 | B1 * | 6/2003 | Bare | H04M 15/8016 370/238 |
| 6,633,755 | B1 * | 10/2003 | Haumont | H04M 15/8044 370/238 |
| 7,178,052 | B2 * | 2/2007 | Hebbar | H04L 45/00 379/221.04 |
| 7,518,986 | B1 * | 4/2009 | Chadalavada | H04L 45/00 370/218 |
| 7,552,262 | B1 * | 6/2009 | Turner | H04L 49/10 370/351 |
| 7,760,744 | B1 * | 7/2010 | Mohaban | H04L 63/029 370/389 |
| 8,509,069 | B1 | 8/2013 | Poon et al. | |
| 8,953,599 | B1 * | 2/2015 | Barth | H04L 45/02 370/390 |
| 9,426,085 | B1 | 8/2016 | Anand et al. | |
| 9,985,869 | B2 * | 5/2018 | Anantharam | H04L 45/026 |
| 2002/0061014 | A1 * | 5/2002 | Saller | H04L 29/06027 370/352 |
| 2004/0066782 | A1 * | 4/2004 | Nassar | H04L 12/2856 370/389 |
| 2004/0073715 | A1 * | 4/2004 | Folkes | H04L 45/00 709/250 |
| 2005/0185632 | A1 * | 8/2005 | Draves, Jr. | H04L 45/02 370/351 |
| 2006/0098573 | A1 * | 5/2006 | Beer | H04L 12/2856 370/230 |
| 2007/0047959 | A1 * | 3/2007 | Thomas | H04Q 11/0067 398/72 |
| 2008/0151766 | A1 * | 6/2008 | Khasnabish | H04L 43/0876 370/252 |
| 2010/0061389 | A1 * | 3/2010 | Sindhu | H04L 49/00 370/412 |
| 2014/0108655 | A1 * | 4/2014 | Kumar | H04L 67/2814 709/226 |
| 2014/0115135 | A1 * | 4/2014 | Allan | H04L 67/1004 709/223 |
| 2015/0063359 | A1 * | 3/2015 | Sella | H04L 45/02 370/397 |
| 2016/0105379 | A1 * | 4/2016 | Murthy | H04L 49/3009 370/392 |
| 2016/0191613 | A1 * | 6/2016 | Srinivasan | H04L 67/10 709/201 |
| 2016/0373340 | A1 * | 12/2016 | Bao | H04L 65/4069 |
| 2018/0007123 | A1 * | 1/2018 | Cheng | H04L 12/4633 |
| 2018/0176307 | A1 * | 6/2018 | Kancherla | H04L 67/141 |
| 2018/0199339 | A1 * | 7/2018 | Thubert | H04L 12/44 |

OTHER PUBLICATIONS

"IEEE Standard for Local and metropolitan area networks—Virtual Bridged Local Area Networks—Bridge Port Extension," IEEE Std 802.1 BR—2012, IEEE Computer Society, Jul. 16, 2012, 136 pp.
Extended Search Report from counterpart European Application No. 18197607.7, dated Feb. 15, 2019, 8 pp.
Response to Extended Search Report dated Feb. 15, 2019, from counterpart European Application No. 18197607.7, filed Dec. 3, 2019, 15 pp.

\* cited by examiner

OPTIMIZING FABRIC PATH FORWARDING FOR VIRTUAL NODES WITHIN AN ELECTRONIC DEVICE

TECHNICAL FIELD

The invention relates to computer networks and, more specifically, to packet routing and switching within computer networks.

BACKGROUND

A computer network is a collection of interconnected computing devices that can exchange data and share resources. In a packet-based network, such as an Ethernet network, the computing devices communicate data by dividing the data into variable-length blocks called packets, which are individually routed across the network from a source device to a destination device. The destination device extracts the data from the packets and assembles the data into its original form.

Certain devices, referred to as routers, maintain routing information representative of a topology of the network. The routers exchange routing information so as to maintain an accurate representation of available routes through the network. A "route" can generally be defined as a path between two locations on the network. Upon receiving an incoming data packet, a router examines information within the packet, often referred to as a "key," to select an appropriate next hop to which to forward the packet in accordance with the routing information.

Routers may include one or more forwarding components, e.g., packet forwarding engines, interconnected by an internal switch fabric. Packet forwarding engines receive and send data with other external devices via interface cards. The switch fabric provides an internal interconnect mechanism for forwarding data within the router between the packet forwarding engines for ultimate transmission over a network. In some examples, a router or switching device may employ a distributed, multi-stage switch fabric architecture, in which network packets traverse multiple stages of the switch fabric located in distributed forwarding components of the router to travel from an ingress point of the switch fabric to an egress point of the switch fabric.

A router may be virtualized into multiple virtual network nodes by portioning hardware resources of the router, such as packet forwarding engines. One or more links may be provisioned between two virtual nodes. For example, an aggregated fabric interface (AF) link that is a logical link construct and provides virtual node connectivity. A source packet forwarding engine may load balance incoming data across the internal switch fabric via the AF link towards a destination packet forwarding engine for ultimate transmission over a network.

SUMMARY

In general, this disclosure describes techniques for directly forwarding a packet from an ingress packet forwarding engine to a particular destination packet forwarding engine (PFE) when internal packet load balancing may otherwise result in an increased number of fabric hops. For example, a source PFE may receive incoming packets destined for a router reachable only by a particular destination PFE (e.g., egress PFE). Rather than load balancing the incoming packets to a destination PFE that is likely to be a non-egress PFE, a source PFE obtains fabric path information associated with the egress PFE from a destination PFE such that source PFE may forward incoming packets directly to the egress PFE. The techniques may provide specific technical improvements, such as reduced fabric hops, especially in situations where a router has been partitioned into multiple virtual nodes and traffic from an ingress PFE and destined for a virtual node is typically internally load balanced across the egress PFEs for the virtual node.

As one example, to obtain fabric path information associated with the egress PFE, a source PFE modifies an incoming packet to include a fabric path header that instructs a receiving PFE to send fabric path information associated with the egress PFE to a path module rather than forwarding the packet to a next fabric hop. Source PFE in turn receives from the path module an indicator (e.g., a hash value) of a particular fabric path to egress PFE for which source PFE may use to forward incoming packets directly to the egress PFE rather than load balancing the packet.

In one example, a method includes receiving, by a source virtual routing node of a single-chassis network device having a plurality of packet forwarding engines (PFEs) and a plurality of fabric links coupling respective pairs of the plurality of PFEs at respective fabric interfaces of the plurality of PFEs, a packet. The method may also include sending, by the source virtual routing node, a modified packet to a receiving PFE of the plurality of PFEs, wherein the modified packet includes a fabric path header added to the packet to request fabric path information associated with the egress PFE. The method may further include receiving, by the source virtual routing node and from the path module, the fabric path information associated with the egress PFE. The method may also include storing, by the source virtual routing node, the fabric path information associated with the egress PFE in forwarding information of the source virtual routing node. The method may further include sending, by the source virtual routing node, a next packet directly to the egress PFE instead of load balancing the next packet.

In another example, a method may include receiving, by a receiving virtual routing node of a single-chassis network device having a plurality of packet forwarding engines (PFEs) and a plurality of fabric links coupling respective pairs of the plurality of PFEs at respective fabric interfaces of the plurality of PFEs, a modified packet from a source virtual routing node, wherein the modified packet includes a fabric path header to request fabric path information associated with the egress PFE. The method may also include determining, by the receiving virtual routing node, that the modified packet includes the header. The method may further include retrieving, by the receiving virtual node and from forwarding information of the receiving virtual node, the fabric path information associated with the egress PFE. The method may also include sending, by the receiving virtual node, the fabric path information associated with the egress PFE to the path module instead of forwarding the modified packet to a next fabric hop.

In another example, a single-chassis network device includes a plurality of packet forwarding engines (PFEs); a plurality of fabric links coupling respective pairs of the plurality of PFEs at respective fabric interfaces of the plurality of PFEs; a first virtual routing node and a second virtual routing node of a plurality of virtual routing nodes, wherein the first virtual routing node is configured to: receive a packet; send a modified packet to a receiving PFE of the plurality of PFEs, wherein the modified packet includes a fabric path header added to the packet to request fabric path information associated with the egress PFE; receive the fabric path information associated with the egress PFE from the path module; store the fabric path information associated with the egress PFE in forwarding information of the first virtual routing node; and send a next packet directly to the egress PFE instead of load balancing the next packet.

The details of one or more examples of the techniques described herein are set forth in the accompanying drawings and the description below. Other features, objects, and advantages of the techniques described herein will be apparent from the description and drawings, and from the claims.

DETAILED DESCRIPTION

Figure 1:
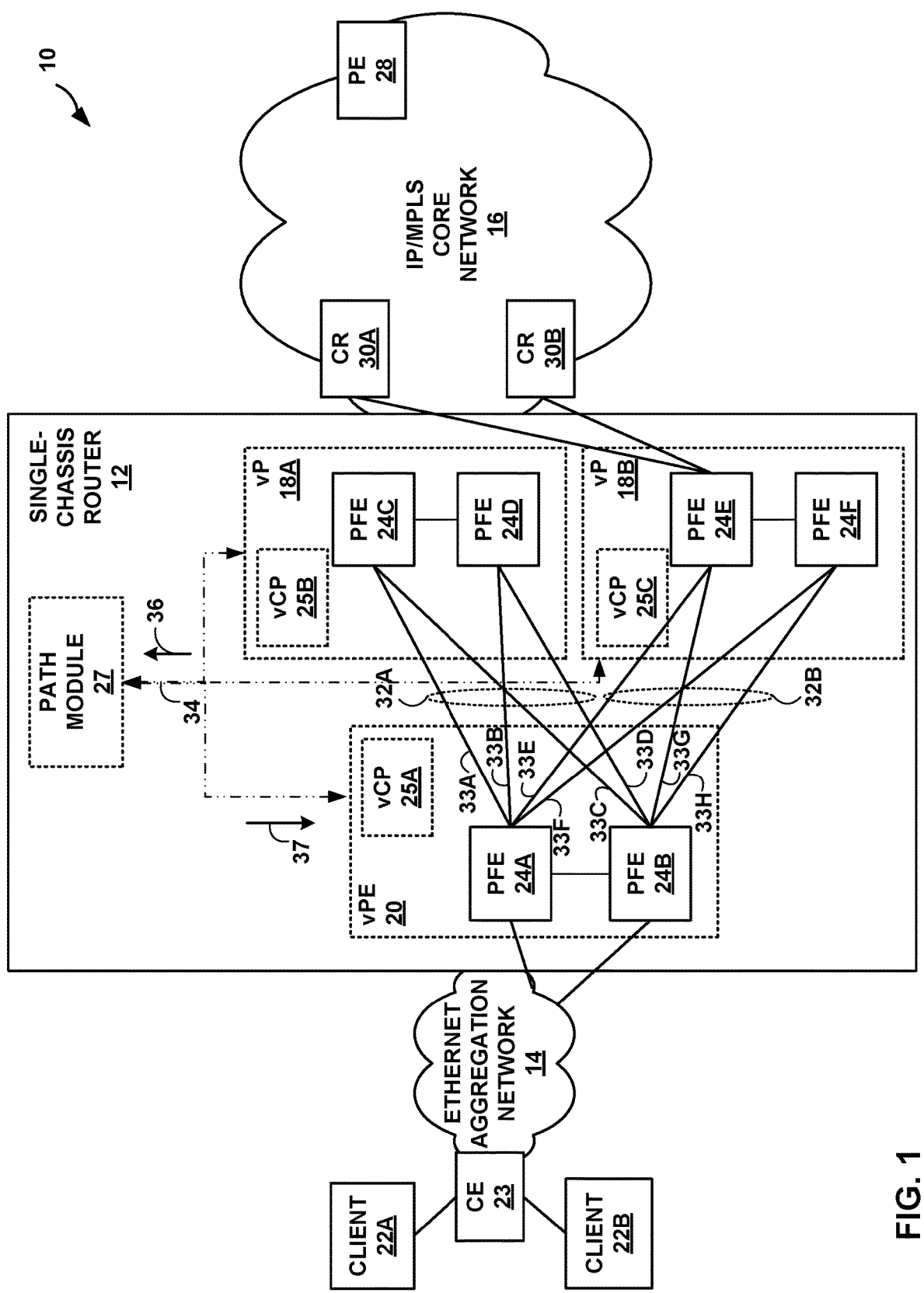
FIG. 1 is a block diagram illustrating an example network environment that includes a logical view of a single-chassis router configured in accordance with techniques described in this disclosure.

FIG. 1 is a block diagram illustrating an example network environment 10 that includes a logical view of a single-chassis router 12 configured in accordance with techniques described in this disclosure. For purposes of example, the techniques of this disclosure are described with respect to a simplified network environment 10 of FIG. 1 in which single-chassis router 12 communicates with core routers (CR) 30A-30B ("core routers 30") to provide client devices 22A-22B ("client devices 22") with access to services provided by devices in Internet Protocol (IP)/Multi-Protocol Label Switching (MPLS) core network 16.

The configuration of network environment 10 illustrated in FIG. 1 is merely an example. Although not illustrated as such, IP/MPLS core network 16 may be coupled to one or more networks administered by other providers, and may thus form part of a large-scale public network infrastructure, e.g., the Internet. Ethernet aggregation network 14 may be viewed as an access network to the Internet. A service provider network may provide computing devices coupled to client devices 22 with access to the Internet, and may allow the computing devices within customer networks (not shown) to communicate with each other. In another example, IP/MPLS core network 16 may provide network services within the core of the Internet. In either case, IP/MPLS core network 16 may include a variety of network devices (not shown) other than single-chassis router 12, provider edge (PE) router 28, and core routers 30, such as additional routers, switches, servers, or other devices.

Single-chassis router 12 includes a virtual provider edge (vPE) node 20 ("vPE 20") and virtual core router (vP) nodes 18A-18B ("vPs 18"), which are cooperative virtual routing components operating as multiple distinct nodes from the perspective of network devices external to single-chassis router 12. Single-chassis router 12 is a router having a single physical chassis, which is virtualized into multiple virtual network nodes (referred to as "vNodes") by portioning hardware resources of the router, such as packet forwarding engines (PFEs). In the example of FIG. 1, each of vNodes 18, 20 includes one or more PFEs, e.g., PFEs 24A-24F ("PFEs 24"). Individual PFEs 24 are associated with a particular vNode and are not shared among multiple vNodes. In the example of FIG. 1, vPE 20 may include PFEs 24A and 24B; vP 18A may include vPEs 20C and 20D; and vP 18B may include PFEs 24E and 24F.

Client devices 22 may be devices associated with one or more customer networks (not shown) coupled to customer edge (CE) router 23. In some examples, client devices 22 may include computing devices, such as personal computers, laptop computers, handheld computers, workstations, servers, switches, printers, customer data centers or other devices, for example. In other examples, client devices 22 may be endpoint devices such as a switch, a router, a gateway, or another terminal that operates as a demarcation point between customer equipment, such as subscriber devices, and service provider equipment. In one example, client devices 22 may comprise a digital subscriber line access multiplexer (DSLAM) or other switching device. For example, client devices 22 may be connected to one or more wireless radios or base stations (not shown) to wirelessly exchange packetized data with subscriber devices. Client devices 22 may comprise a switch, a router, a gateway, or another terminal that aggregates the packetized data received from the wireless radios to CE router 23. In some examples, aggregation network 14 may include an optical access network. For example, CE router 23 may comprise an optical line terminal (OLT) connected to one or more client devices 22 or optical network units (ONUs) via optical fiber cables.

Client devices 22 may be access nodes coupled to customer networks and subscriber devices. Client devices 22 are clients of services provided by PE router 28. In this example, a service provider network includes client devices 22 and customer edge (CE) router 23 that provide subscriber devices with access to aggregation network 14. In some examples, CE router 23 may comprise a router that maintains routing information between subscriber devices and aggregation network 14. CE router 23, for example, may include Broadband Remote Access Server (BRAS) functionality to aggregate output from one or more client devices 22 into a higher-speed uplink to aggregation network 14.

Single-chassis router 12 includes multiple routing components (e.g., routing processes) and forwarding components (e.g., PFEs 24) that are physically coupled and configured to operate as separate logical routers. To core routers 30 and CE router 23 of network environment 10, single-chassis router 12 appears as multiple routing devices, specifically, virtual PE (vPE) router 20, and virtual provider (vP) routers 18. For example, although single-chassis router 12 includes a single chassis, from the perspective of core routers 30, single-chassis router 12 has multiple externally-advertised network addresses and maintains multiple peer routing sessions for each routing protocol maintaining peer routing sessions with each of the core routers 30.

Each vNode's control plane (vCP) 25A-25C ("vCPs 25") instantiates with virtual machine (VM) technology. The vCP 25 either could be within the routing engine (RE) of single-chassis router 14 or outside the RE. Each vNode could serve the role of different network functions, such as Internet service provider edge (PE), Virtual Private Network (VPN) service PE and Multiprotocol Label Switching (MPLS) Label Switching Router (LSR). Apart from these vNodes, in some examples single-chassis router 12 may also include an administrative VM instantiated for shared resources management (e.g., a management plane, not shown in FIG. 1).

Between two vNodes in single-chassis router 12, one logical layer-3 link is provisioned that is visible to devices external to single-chassis router 12. For example, in FIG. 1, aggregated fabric interface (AF) links 32A-32B ("AF links 32") provide a logical link between vPE 20 and vP 18A, and vPE 20 and vP 18B, respectively. Each of AF links 32 are layer-3 logical link constructs and provide vNode to vNode connectivity. AF links 32 bundle those fabric interconnects that connect the same vNodes. AF provide a single logical link connectivity between the vNodes, and could have many layer-1, layer-2, or layer-3 fabric bundling within, depending on implementation.

AF 32A includes fabric interconnects 33A-33D, and AF 32B includes fabric interconnects 33E-33H (collectively, "fabric interconnects 33"). Fabric interconnects terminate at fabric interfaces of one of PFEs 24. The fabric interfaces have identifiers that are not generally advertised to devices external to single-chassis router 12. The fabric interconnects 33 are modelled as point-to-point Ethernet links between a pair of PFEs 24. AF and fabric interfaces (FIs) emulate point-to-point interfaces.

In one example, assume vPE 20 provides MPLS-based VPN services, and CE 23 connects to PFE 24A. Assume also that vPE 20 connects to vP 18A with fabric equal cost logical paths via PFE 24C and PFE 24D, and vPE 20 connects to vP 18B with fabric equal cost logical paths via PFE 24E and PFE 24F. When a packet comes to vPE 20 from Ethernet aggregation network 14 and destined for PE 28, in the absence of the techniques of this disclosure vPE 20 would send data traffic to any of PFEs 24C-24F based on ECMP load balancing. For example, AF link 32A may include fabric interfaces 33A-33D to interconnect PFEs of vPE 20 to PFEs of vP 18A, and fabric interfaces 33E-33H to interconnect PFEs of vPE 20 to PFEs of vP 18B. vPE 20 may perform a hashing algorithm to determine which one of fabric interconnects 33 that is used for an outgoing interface. However, the hash is independent of the egress interface on the egress PFE.

Assume that PE 28 is reachable from vP 18B only via PFE 24E. Conventionally, vPE 20 load balances traffic toward the fabric. If a non-egress destination PFE receives the traffic, the non-egress PFE typically forwards the traffic to egress PFE 24E to forward the packet out a WAN link to IP/MPLS core 16. This results in an additional fabric hop that consumes fabric bandwidth. By load balancing the traffic, the chances of the traffic forwarded to a non-egress destination PFE is [(n−1)/n]*100 percent. In the example of FIG. 1, when PFE 24A load balances traffic toward the fabric, the chances of forwarding the traffic to a PFE other than PFE 24E is 83.3%. As the number of PFEs increase, the chances of forwarding the traffic to a non-egress PFE approaches 100%, thereby increasing the likelihood of performing an extra fabric hop that wastes bandwidth.

In accordance with the techniques of this disclosure, source PFE may directly send traffic to a particular destination PFE (e.g., egress PFE) instead of load balancing the traffic. For example, a virtual node of single-chassis router 12 may send fabric path information associated with an egress PFE to path module 27 such that path module 27 may push the fabric path information to a source virtual node to steer incoming traffic directly to the egress PFE instead of load balancing the traffic. In some examples, path module 27 may include a telemetry server that receives statistics and performs additional functions such as monitoring traffic flows and aging out traffic flows. Although path module 27 is illustrated as within the single-chassis router 12, path module 27 may be external to the single-chassis router 12.

In the example of FIG. 1, a source PFE, e.g., PFE 24A, of source virtual node vPE 20 may receive traffic from Ethernet aggregation network 14 that is destined for PE 28. Source PFE 24A may perform a lookup to determine whether a fabric path to egress PFE is known. Responsive to a determination that the egress PFE is not known, source PFE 24A may e.g., modify a copy of the incoming packet to include, e.g., a fabric path header, that instructs a receiving PFE to send fabric path information associated with the egress PFE to path module 27 rather than forwarding the packet to the next fabric hop. In some examples, source PFE 24A may modify incoming packets identified as having a high packet rate, as further described below in FIG. 2. Source PFE 24A then load balances the modified packet and the original packet towards the fabric.

In one instance, a non-egress PFE (also referred to herein as "receiving PFE"), e.g., PFE 24D, may receive the modified packet and the original packet. Non-egress PFE 24D performs a lookup of its forwarding information to determine the egress PFE, e.g., PFE 24E. In some examples, the original packet is forwarded to the next fabric hop to egress PFE 24E. Rather than forward the modified packet to the next fabric hop, non-egress PFE 24D may send fabric path information 36 to path module 27 based on the modified packet. Fabric path information 36 may include a lookup value (i.e., information associated with egress PFE 24E), the Hash value associated with source PFE 224A, and information associated with source PFE 224A, for example. In some examples, receiving PFE 24D may send fabric path information 36 directly to source PFE 24A.

PFE 24D may communicate with path module 27 using a connection 34. Connection 34 may be a communication channel established between PFEs 24 and path module 27 to exchange fabric path information. Connection 34 may be, for example, established using User Datagram Protocol (UDP). In the example of FIG. 1, connection 34 is established between vPE 20 and path module 27, between vP 18A and path module server 27, and between vP 18B and path module 27. Although not illustrated, other virtual nodes may establish connections with path module 27.

Path module 27 may receive fabric path information 36 from non-egress PFE 24D and may push the fabric path information ("fabric path information 37") to source PFE 24A. Source PFE 24A may receive the fabric path information 37 and may store the information associated with egress PFE 24E. In this way, upon receiving incoming traffic, source PFE 24A may perform a lookup of its forwarding information and determine a fabric path to egress PFE 24E known, and directly forwards the incoming traffic to egress PFE 24E instead of load balancing the packet.

In some examples, path module 27 may monitor the fabric path to egress PFE 24E. In instances where the fabric path to PFE 24E is unavailable or no longer valid, path module 27 may remove the fabric path or redirect the traffic to another fabric path to another destination PFE configured with the techniques described above.

In this way, incoming packets received from a source PFE are directly forwarded to a particular destination PFE, thereby eliminating the possibility of forwarding the packets to a non-egress PFE and incurring additional fabric hops that waste bandwidth.

Figure 2:
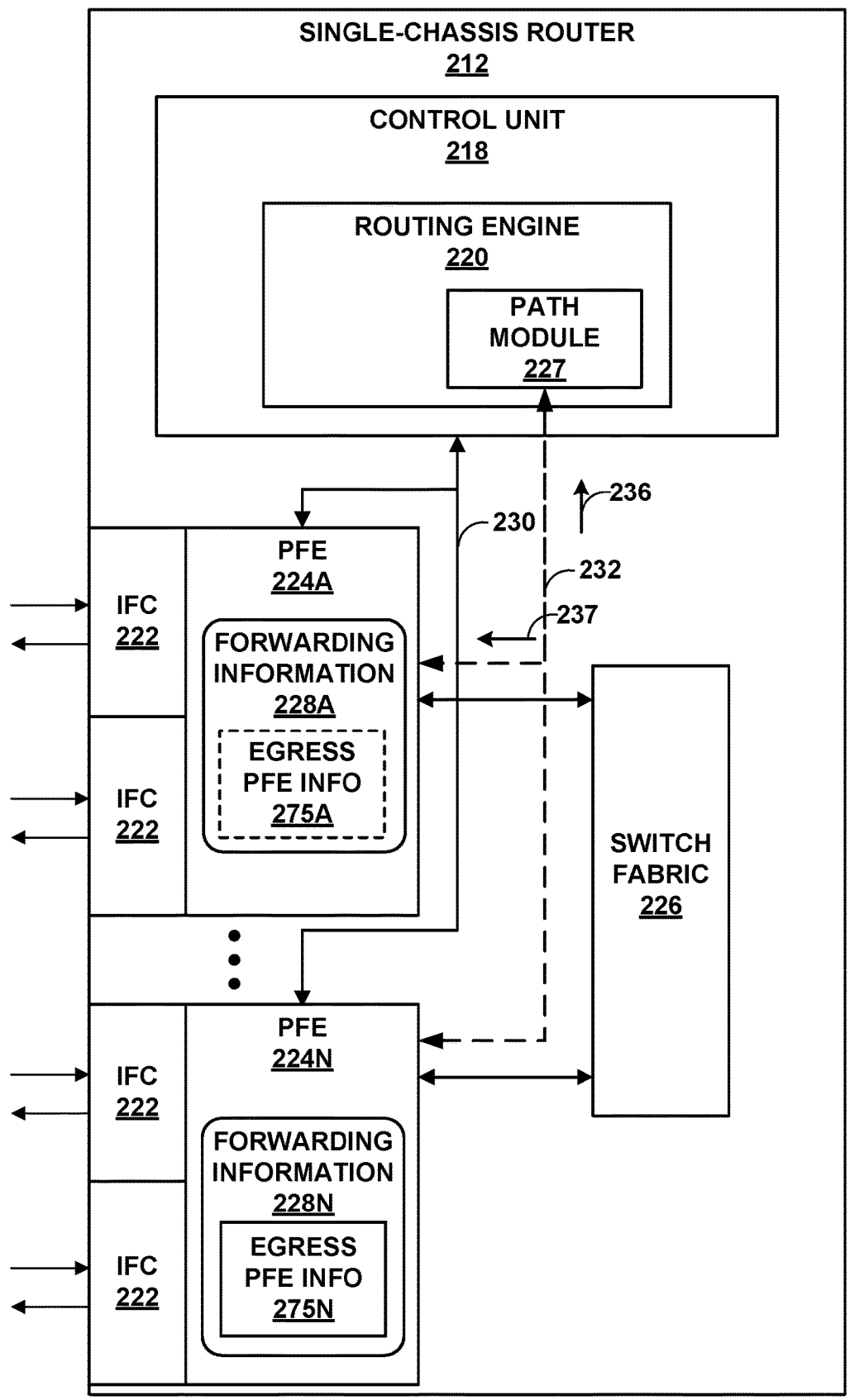
FIG. 2 is a block diagram illustrating an example single-chassis router of FIG. 1 that directly forwards a packet to a particular destination PFE instead of load balancing the packet, in accordance with the techniques described in this disclosure.

FIG. 2 is a block diagram illustrating an example single-chassis router 212 that provides directly forwarding packets to a particular destination PFE instead of load balancing, in accordance with the techniques described in this disclosure. Single-chassis router 212 may represent single-chassis router 12 of FIG. 1. Single-chassis router 212 may include multiple virtual nodes operating as, for example, virtual provider edge or virtual customer edge routers, virtual autonomous system border routers (ASBRs), virtual area border routers (ABRs), or another type of network device, such as a virtual switch.

In this example, single-chassis router 212 includes a control unit 218 that provides control plane functionality for single-chassis router 212. Control unit 218 may be distributed among multiple entities, such as one or more routing units and one or more service cards insertable into single-chassis router 212. In such instances, single-chassis router 212 may therefore have multiple control planes. In some examples, each virtual routing node of single-chassis router 212 may have its own virtual control plane, e.g., vCPs 25 of FIG. 1.

Control unit 218 may include a routing engine 220 that provides control plane functions, storing network topology in the form of routing tables, executing routing protocols to communicate with peer routing devices, and maintaining and updating the routing tables. Routing engine 220 also provides an interface to allow user access and configuration of single-chassis router 212.

Single-chassis router 212 also includes a plurality of forwarding components in the form of example packet forwarding engines 224A-224N ("PFEs 224") and a switch fabric 226, that together provide a forwarding plane for forwarding and otherwise processing subscriber traffic. PFEs 224 may be, for example, any of PFEs 24 of FIG. 1.

Control unit 218 is connected to each of PFEs 224 by internal communication link 230. Internal communication link 230 may comprise a 100 Mbps or 1 Gbps Ethernet connection, for instance. Routing engine 220 may execute daemons (not shown), e.g., user-level processes that may run network management software, to execute routing protocols to communicate with peer routing devices, execute configuration commands received from an administrator, maintain and update one or more routing tables, manage subscriber flow processing, and/or create one or more forwarding tables for installation to PFEs 224, among other functions.

Control unit 218 may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 218 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

PFEs 224 receive and send data packets via interfaces of interface cards 222A-222N ("IFCs 222") each associated with a respective one of PFEs 224. Each of PFEs 224 and its associated ones of IFCs 222 may reside on a separate line card (not shown) for single-chassis router 212. Example line cards include flexible programmable integrated circuit (PIC) concentrators (FPCs), dense port concentrators (DPCs), and modular port concentrators (MPCs). Each of IFCs 222 may include interfaces for various combinations of layer two (L2) technologies, including Ethernet, Gigabit Ethernet (GigE), and Synchronous Optical Networking (SONET) interfaces. In various aspects, each of PFEs 224 may comprise more or fewer IFCs.

Switch fabric 226 provides a high-speed interconnect for forwarding incoming data packets to the selected one of PFEs 224 for output over a network. Switch fabric 226 may include multiple fabric links (not shown), such as fabric links 33 of FIG. 1. In some examples, switch fabric 226 may be a distributed, multi-stage switch fabric architecture, in which network packets traverse multiple stages of the switch fabric located in distributed forwarding components of the router to travel from an ingress point of the switch fabric to an egress point of the switch fabric. As one example, switch fabric 226 may be implemented as a single multi-stage Clos switch fabric, which relays communications across the stages of the switch fabric. A typical multi-stage Clos switch fabric has a plurality of switches interconnected to form a plurality of stages. In a typical arrangement, the switch fabric includes an ingress (or "first") stage, one or more intermediate stages, and an egress (or "final") stage, with each stage having one or more switches (e.g., crossbar switches—often referred to more simply as "crossbars"). Moreover, the switch fabric may be implemented such that the switches are arranged as multiple parallel fabric planes that each provide independent forwarding from ingress ports to egress ports through the multiple stages, one or more of which may be treated as a spare fabric plane. In other words, each of the parallel fabric planes may viewed as an independent portion of the multi-stage Clos switch fabric, where each plane provides switching redundancy.

PFEs 224 process packets by performing a series of operations on each packet over respective internal packet processing paths as the packets traverse the internal architecture of single-chassis router 212. Operations may be performed, for example, on each packet by any of a corresponding ingress interface, an ingress PFE 224, an egress PFE 224, an egress interface or other components of single-chassis router 212 to which the packet is directed prior, such as one or more service cards. The result of packet processing determines the way a packet is forwarded or otherwise processed by PFEs 224 from its input interface on one of IFCs 222 to its output interface on one of IFCs 222.

The example of FIG. 2 shows each of PFEs 224 as including forwarding information 228 (otherwise referred to as forwarding information base (FIB)). Forwarding information 228A, provides forwarding information for use in the forwarding plane when looking up next hops.

To illustrate by way of an example, assume PFE 224A represents PFE 24A of FIG. 1. PFE 224A may receive incoming traffic via an ingress interface on one of IFCs 222. PFE 224A may determine, from a lookup of forwarding information 228A, whether information associated with a particular destination PFE, e.g., egress PFE information 275A ("egress PFE info 275A"), is known.

If PFE 224A determines that egress PFE info 275A is not in forwarding information 228A, PFE 224A may initiate instructions to request fabric path information associated with the egress PFE. For example, PFE 224A may modify a copy of the packet to include a fabric path header that instructs a receiving PFE to send fabric path information associated with the egress PFE to path module 227 instead of forwarding the packet to a next fabric hop. In some examples, the header may include a hash value associated with source PFE 224A and information associated with source PFE 224A.

PFE 224A may load balance the original packet and the modified packet towards the fabric via an egress interface of one of IFCs 222 of PFE 224A. In load balancing, a hash algorithm chooses an egress interface from the aggregated fabric interface (e.g., AF 32A of FIG. 1) when Equal-Cost Multi-Path (ECMP) is available for a prefix. That is, PFE 224A may select a next hop from a list of next hops of the AF and sends the original packet and modified packet to the selected next hop towards a receiving PFE via an outbound interface on one of IFCs 222.

Assume for example, PFE 224N represents non-egress PFE 24D of FIG. 1. PFE 224N may receive, from PFE 224A, the original packet and modified packet via an ingress interface on one of IFCs 222. Based on a determination that the modified packet includes the fabric path header, PFE 224N may perform a lookup of forwarding information 228N to determine information associated with the egress PFE (e.g., egress PFE information 275N) and may send the lookup information 236 to path module 227. In some examples, non-egress PFE 224N may send the fabric path information directly to source PFE 224A. In some examples, the receiving PFE 224N may send information including the lookup information associated with the egress PFE, information associated with the source PFE, and the hash value (collectively referred to herein as, "fabric path information"). Path module 227 may push the fabric path information 237 to source PFE 224A. The source PFE may install the fabric path information as egress PFE information 275A in forwarding information 228A. The receiving PFE 224N may forward the original packet to egress PFE 224E for ultimate transmission over the network and may drop the modified packet.

Upon receiving incoming packets, the source PFE 224A may lookup forwarding information 228A and determine a particular destination PFE based on egress PFE information 275A. In this way, source PFE 224A may directly forward incoming packets to a particular destination PFE instead of load balancing the traffic.

Figure 3:
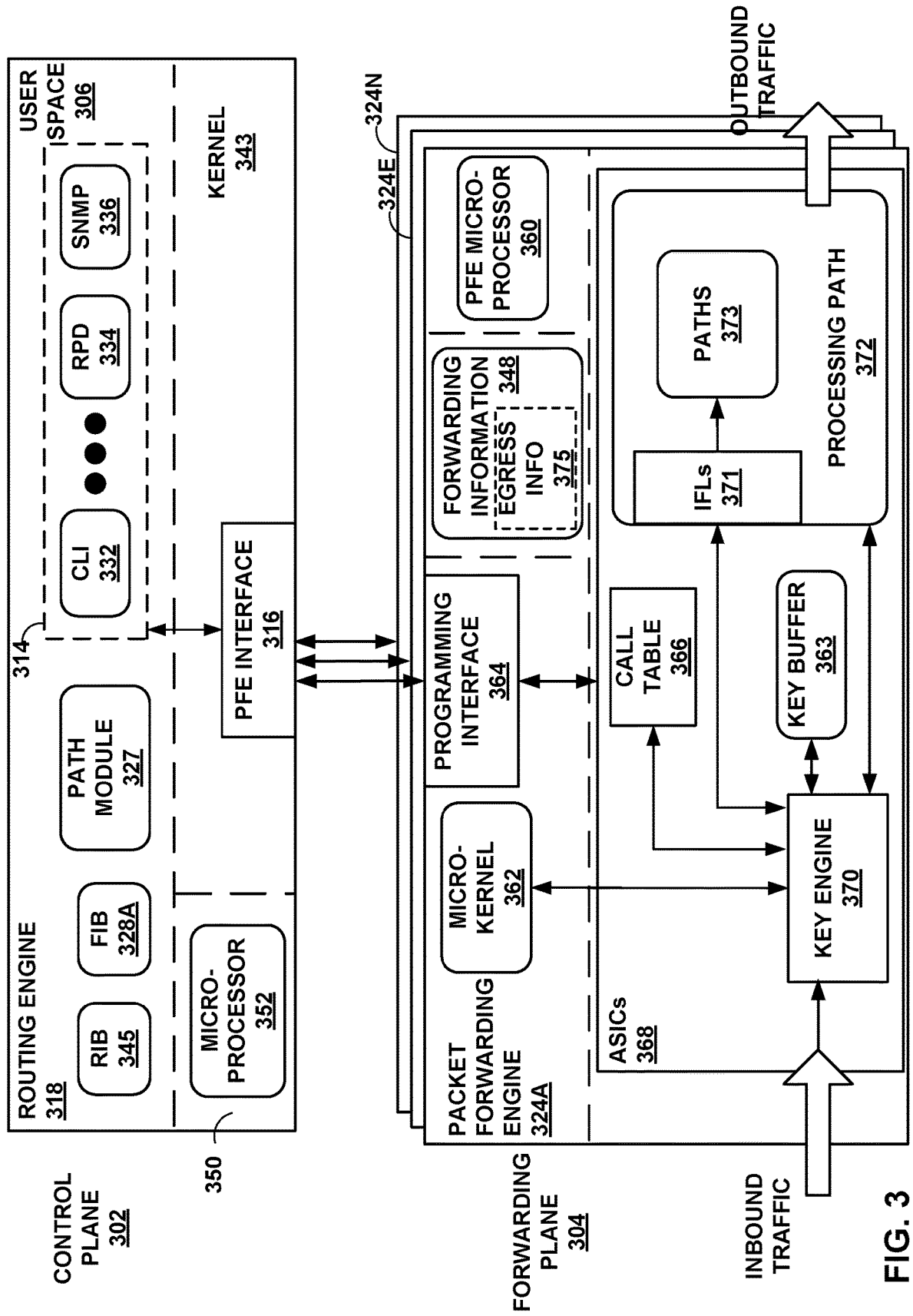
FIG. 3 is a block diagram illustrating example instances of the control unit and packet forwarding engine of FIG. 2 in further detail.

FIG. 3 is a block diagram illustrating example instances of routing engine 318 and packet forwarding engines 324 ("PFEs 324") of routing engine 218 and PFEs 224 of FIG. 2 in further detail. In this example, routing engine 318 provides a control plane 302 operating environment for execution of various user-level daemons 314 executing in user space 306. Daemons 314 are user-level processes that may run network management software, execute routing protocols to communicate with peer routing devices, execute configuration commands received from an administrator, maintain and update one or more routing tables, manage subscriber flow processing, and/or create one or more forwarding tables for installation to PFEs 324, among other functions. In this example, daemons 314 include command-line interface daemon 332 ("CLI 332"), routing protocol daemon 334 ("RPD 334"), and Simple Network Management Protocol daemon 336 ("SNMP 336"). In this respect, control plane 302 may provide routing plane, service plane, and management plane functionality for single-chassis router 212. Various instances of routing engine 318 may include additional daemons 314 not shown in FIG. 3 that perform other control, management, or service plane functionality and/or drive and otherwise manage forwarding plane functionality for single-chassis router 212.

Daemons 314 operate over and interact with kernel 343, which provides a run-time operating environment for user-level processes. Kernel 343 may comprise, for example, a UNIX operating system derivative such as Linux or Berkeley Software Distribution (BSD). Kernel 343 offers libraries and drivers by which daemons 314 may interact with the underlying system. PFE interface 316 of kernel 343 comprises a kernel-level library by which daemons 314 and other user-level processes or user-level libraries may interact with programming interface 364 of PFE 324A. PFE interface 316 may include, for example, a sockets library for communicating with PFE 324A over dedicated network links.

Hardware environment 350 of routing engine 318 comprises microprocessor 352 that executes program instructions loaded into a main memory (not shown in FIG. 3) from storage (also not shown in FIG. 3) in order to execute the software stack, including both kernel 343 and user space 306, of routing engine 318. Microprocessor 352 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

RPD 334 executes one or more interior and/or exterior routing protocols to exchange routing information with other network devices and store received routing information in routing information base 345 ("RIB 345"). For example, RPD 334 may execute protocols such as one or more of Border Gateway Protocol (BGP), including interior BGP (iBGP), exterior BGP (eBGP), multiprotocol BGP (MP-BGP), Label Distribution Protocol (LDP), and Resource Reservation Protocol with Traffic-Engineering Extensions (RSVP-TE). RPD 334 may additionally, or alternatively, execute User Datagram Protocol (UDP) to send and receive data for various system resources, such as physical interfaces. For example, RPD 334 may use UDP to send and receive data from path module 327. Although illustrated with UDP, RPD 334 may execute any protocol to exchange data for system resources with path module 327.

RIB 345 may include information defining a topology of a network, including one or more routing tables and/or link-state databases. RPD 334 resolves the topology defined by routing information in RIB 345 to select or determine one or more active routes through the network and then installs these routes to forwarding information base 328A ("FIB 328A"). Typically, RPD 334 generates FIB 328A in the form of a radix or other lookup tree to map packet information (e.g., header information having destination information and/or a label stack) to next hops and ultimately to interface ports of interface cards associated with respective PFEs 324. Kernel 343 may synchronize FIB 328A of routing engine 318 with forwarding information 348 of PFE 324A.

Command line interface daemon 332 ("CLI 332") provides a shell by which an administrator or other management entity may modify the configuration of single-chassis router 212 using text-based commands. SNMP 336 comprises an SNMP agent that receives SNMP commands from a management entity to set and retrieve configuration and management information for single-chassis router 212. Using CLI 332 and SNMP 336, for example, management entities may enable/disable and configure services, manage classifications and class of service for packet flows, install routes, enable/disable and configure rate limiters, configure traffic bearers for mobile networks, and configure interfaces, for example. RPD 334, CLI 332, and SNMP 336 in this example configure forwarding plane 304 via PFE interface 316 to implement configured services, and/or add/modify/delete routes. PFE interface 316 allows daemons 314 to drive the installation and configuration of packet processing path 372 of PFE 324A. In particular, PFE interface 316 includes an application programming interface (API) by which daemons 314 may map packet flows to fabric interfaces for forwarding.

PFE 324A, in combination with other PFEs 324 of single-chassis router 212, implements forwarding plane 304 (also known as a "data plane") functionality to handle packet processing from ingress interfaces on which packets are received to egress interfaces to which packets are sent. Forwarding plane 304 determines data packet forwarding through single-chassis router 212, applies services, rate limits packet flows, filters packets, and otherwise processes the packets using service objects and lookup data installed by control plane 302 to forwarding plane 304. Although FIG. 3 illustrates only PFE 324A in detail, each of PFEs 324 of single-chassis router 212 comprises similar modules that perform substantially similar functionality.

PFE 324A includes application-specific integrated circuit based packet processors ("ASICs 368") that execute processing path 372 in accordance with techniques described herein. ASICs 368 include one or more programmable application-specific integrated circuits having a key engine 370 that executes microcode (or "microinstructions") to control and apply fixed hardware components of ASICs 368 to process packet "keys." A packet key includes packet fields and other parameters that determine a flow of packet processing for the packet along an internal processing path, such as paths 373. Key engine 370 includes key buffer 363 to store packet field data for corresponding packets that the key engine is currently processing. Key buffer 363 may also provide limited writable memory to which elements of the internal processing path may write to pass messages accessible by future elements. Some instances of ASICs 368 may include a plurality of key engines each having an associated key buffer.

Internal processing path 372 ("processing path 372") of ASICs 368 comprises programmable, executable microcode and fixed hardware components that determine the packet processing actions and other operations performed by key engine 370. PFE 324A may store executable instructions of processing path 372 in computer-readable storage media, such as static random access memory (SRAM). While illustrated within ASICs 368, in some examples executable instructions of processing path 372 may be stored in memory external to ASICs 368 in PFE 324A.

In some aspects, processing path 372 includes a next hop data structure to initiate processing. At the end of each processing step by key engine 370, the result is a next hop that may specify additional processing or the termination of processing, for instance. In addition, next hops may specify one or more functions to be executed by key engine 370 and/or one or more hardware elements to be applied (e.g., policers). Key engine 370 may be associated with a result (or "lookup") buffer (not shown) that stores results for executing next hops. For example, key engine 370 may execute a lookup specified by a list of next hops and store the result of the lookup to the associated result buffer. The contents of a result buffer may affect the actions of the next hop.

Logical interfaces 371 ("IFLs 371") is a table or other data structure that includes one or more logical interfaces. Each of IFLs 371 is an interface to a processing path of paths 373. Paths 373 represents one or more processing paths for execution by key engine 370 on key buffer 363.

PFE microprocessor 360 manages ASICs 368 and executes programming interface 364 to provide an interface for/to routing engine 318. Programming interface 364 may comprise one or more user- or kernel-level libraries, programs, toolkits, application programming interfaces (APIs) and may communicate control and data messages to PFEs 324 via internal communication link (e.g., communication link 230) using sockets, for example. PFE microprocessor 360 may execute a microkernel 362 to provide an operating environment for interfaces. Programming interface 364 receives messages from routing engine 318 directing packet forwarding engine 324A to configure logical interfaces 371.

In operation, a source PFE, e.g., source PFE 324A, may receive an incoming packet to be communicated through the fabric. Key engine 370 of source PFE 324A performs a lookup of forwarding information 348 to determine whether fabric path information associated with a particular destination PFE (e.g., egress PFE 324E) is known. As one example, key engine 370 may perform a longest prefix match on the incoming packet to determine whether fabric path information associated with egress PFE 324E is known. A successful match of the longest prefix provides source PFE 324A next hop information to an egress PFE, whereas a failed match of the longest prefix indicates that fabric path information associated with egress PFE 324E is not known and source PFE 324A may initiate instructions to obtain fabric path information associated with egress PFE 324E.

In response to a failed longest prefix match, source PFE 324A initiates instructions to obtain fabric path information associated with egress PFE 324E. For example, micro-kernel 362 of source PFE 324A modifies a copy of the incoming packet to include a fabric path header before load balancing the modified packet. The fabric path header may provide an indication for a receiving PFE to send fabric path information associated with egress PFE 324E to a path module 327 instead of forwarding the packet to the next fabric hop. In some examples, the fabric path header may include the hash value and information associated with source PFE 324A. In some examples, micro-kernel 362 may modify an incoming packet determined to have a high packet rate. To determine high packet rate data flows, micro-kernel 362 may perform a shorter prefix match on the incoming packets and count the number of matches within a defined period of time. For example, for each match, micro-kernel 362 may store each match count into forwarding information 348. If the number of matches exceeds a defined threshold packet rate, micro-kernel 362 may store the next incoming packet that matches the shorter prefix, e.g., as a hash value, in forwarding information 348. Micro-kernel 362 may modify the next incoming packet to include a fabric path header. This way, PFE 324A may add the fabric path header to a packet determined to have a high packet rate.

Source PFE 324A then load balances the original packet and the modified packet towards the fabric. For example, micro-kernel 362 outputs the original packet and modified packet via the corresponding one of IFLs 371 towards a selected next-hop to a PFE (e.g., PFE 324N) among a list of next hops to PFEs in paths 373.

Non-egress PFE 324N receives the original packet and modified packet and key engine 370 of non-egress PFE 324N determines that the modified packet includes the fabric path header. Instead of forwarding the modified packet to egress PFE 324E, non-egress PFE 324N performs a lookup of the destination PFE (e.g., egress PFE 324E), and may send the lookup information to path module 327 via microkernel 362. In some examples, non-egress PFE 324N may also send the hash value and information associated with the source PFE that was included in the fabric path header. In some examples, receiving PFE 324N may send the fabric path information directly to source PFE 324A. Non-egress PFE 324N may forward the original packet to egress PFE 324E for ultimate transmission over the network and may drop the modified packet.

Path module 327 pushes the fabric path information to source PFE 324A. For example, path module 327 may send via kernel 343 a hash entry of a fabric path to egress PFE ("EGRESS INFO 375") that is stored in forwarding information 348. The hash entry may be an entry with the longest prefix. Kernel 343 may also mark the outgoing interface of IFLs 371 towards egress PFE 324E. In this way, when source PFE 324A performs a lookup of the next incoming packet, source PFE 324A may determine the fabric path to egress PFE 324A is known for which key engine 370 may output the packet via the marked interface of IFLs 371 towards a next hop to egress PFE 324E.

For example, in response to receiving the next incoming packet, key engine 370 of source PFE 327A may perform the longest prefix match as described above. Responsive to a successful longest prefix match, PFE 324A, based on the lookup information, sends the packet out of the marked interface of IFLs 371 directly towards egress PFE 324E instead of load balancing the packet.

In some examples, path module 327 may monitor the availability of fabric path to egress PFE 324E. Path module 327 may determine if a fabric path to egress PFE 324E is unavailable, path module 327 may determine a fabric path to another egress PFE 324. For example, forwarding information 348 may also store in forwarding information 348 the hash entry of the fabric path to egress PFE 324E as a sample to be monitored. Each time an incoming packet is determined to have a high packet rate, micro-kernel 362 may send a copy of the hash value for the sample to path module 327 to determine if the fabric path to egress PFE is still available.

Figure 4:
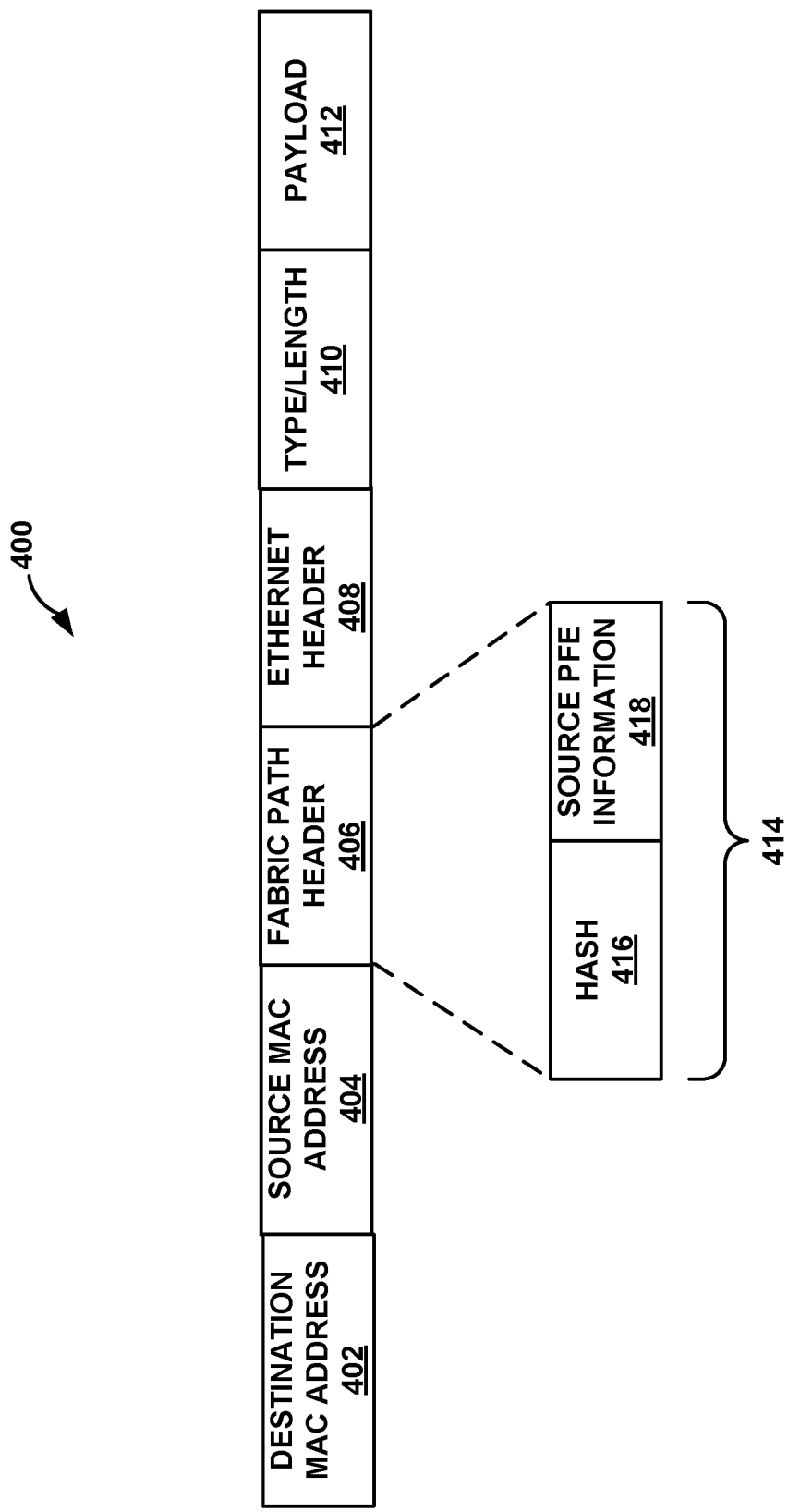
FIG. 4 is a block diagram illustrating an example packet, in accordance with the techniques described herein.

FIG. 4 is a block diagram illustrating an example modified packet 400, in accordance with the techniques described herein. In the example of FIG. 4, packet 400 may include a destination MAC address field 402, a source MAC address field 404, a fabric path header field 406, an Ethernet header field 408, a type/length field 410, and a payload 412.

The destination MAC address field 402 may include the MAC address of the destination node (e.g., PE device 28 of FIG. 1). The source MAC address field 404 may include the MAC address of the source node (e.g., CE device 23 of FIG. 1). Ethernet header field 408 may be based on the Institute of Electrical and Electronics Engineers (IEEE) 802.1Q standard, for example. The type field 410 may include the type of connection as well as the length of packet 400. The payload 412 may include the data of the packet.

The fabric path header field 406 may be based on the IEEE 802.1BR standard, for instance. In some examples, fabric header field 406 may be 16-bytes wide, wherein 2 bytes are reserved for the Ethernet Type, and the remaining 14 bytes may be used to include additional information 414, such as a hash value 416, and information associated with the source PFE 418, as described above.

Figure 5:
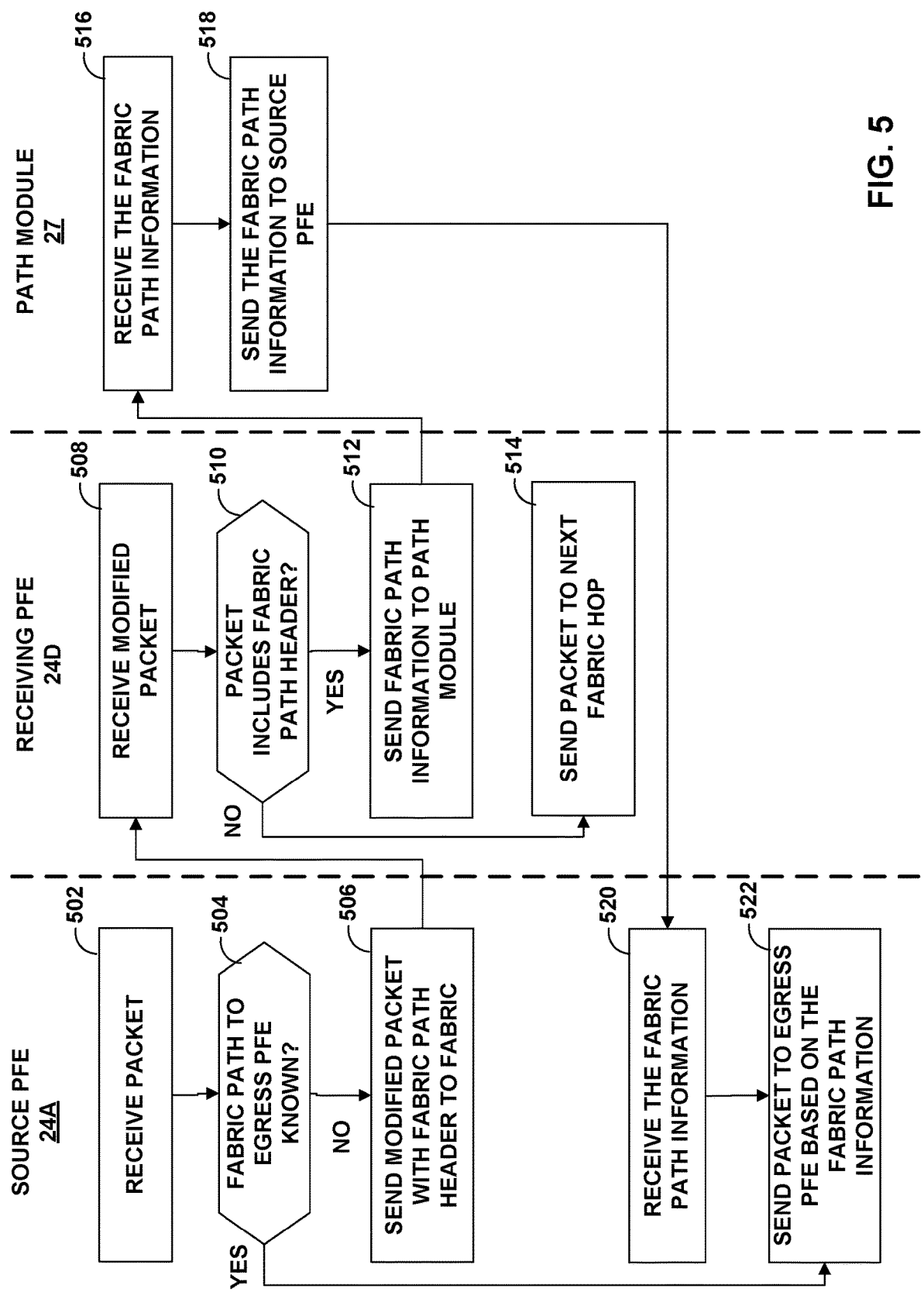
FIG. 5 is a flowchart illustrating an example mode of operation according to techniques described in this disclosure.

FIG. 5 is a flowchart illustrating an example operation of network devices in accordance with one or more aspects of the disclosure. FIG. 4 will be described for purposes of example with respect to FIGS. 1A-1B, 2, and 3. A source PFE 24A of a virtual node, e.g., vPE 20A of FIG. 1, receives a packet (502). Source PFE 24A determines whether fabric path information associated with an egress PFE is known (504). As described above, a source PFE 24A may perform a longest prefix match to determine if fabric path information associated with egress PFE 24E is known.

Responsive to a determination that the information associated with the egress PFE is known ("YES" branch of 504), source PFE 24A sends an incoming packet directly to egress PFE 24E (522).

In response to a determination that the information associated with the egress PFE is not known ("NO" branch of 504), source PFE 24A sends, by load balancing, a modified copy of the packet that includes a fabric path header to the fabric (506). The fabric path header instructs a second virtual routing node to send fabric path information associated with the egress PFE to path module 27 instead of to the next fabric hop. As described above, the fabric path header may include the hash value and information associated with source PFE 24A. Source PFE 24A may load balance the original packet and the modified packet towards a next-hop to a PFE selected among a list of next hops to PFEs.

Receiving PFE 24D receives the modified packet (508) and determines whether the packet includes the fabric path header (510). In response to a determination that the received packet includes the fabric path header ("YES" branch of 510), receiving PFE 24D may send lookup information including fabric path information to path module 27 (512). As described above, the fabric path information may include information associated with egress PFE 24E, and the hash value and information associated with source PFE 24A that was included in the fabric path header. In some examples, receiving PFE 24D may send the fabric path information directly to source PFE 24A. Alternatively, responsive to a determination that a received packet does not include the fabric path header ("NO" branch of 510), receiving PFE 24D forwards the received packet to the next fabric hop. Although not shown, receiving PFE 24D may forward the original packet to egress PFE 24E for ultimate transmission over the network and may drop the modified packet.

Path module 27 may receive the fabric path information from receiving PFE 24D (516) and may send the fabric path information to source PFE 24A (518). For example, path module 27 may send a hash entry for the fabric path to egress PFE 24E. In some example, the hash entry for the fabric path to egress PFE 24E may be a longest prefix.

Source PFE 24A may receive, from path module 27, the fabric path information associated with egress PFE 24E (520). Source PFE 24A may store the fabric path information associated with egress PFE 24E in its forwarding information.

In response to receiving a next incoming packet, source PFE 24A, as described above, determines whether fabric path information associated with an egress PFE is known (504) and upon a successful lookup of the fabric path to egress PFE 24E, sends the incoming packet directly to egress PFE 24E (522).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   receiving, by a source virtual routing node of a single-chassis network device having a plurality of packet forwarding engines (PFEs) and a plurality of fabric links coupling respective pairs of the plurality of PFEs at respective fabric interfaces of the plurality of PFEs, a packet;
   determining, by the source virtual routing node, whether the packet has a high packet rate;
   in response to determining that the packet has the high packet rate, sending, by the source virtual routing node, a modified packet to a receiving PFE of the plurality of PFEs, wherein the modified packet is the packet with the high packet rate that is modified to include a fabric path header to request fabric path information associated with the egress PFE;
   receiving, by the source virtual routing node and from a path module, the fabric path information associated with the egress PFE;
   storing, by the source virtual routing node, the fabric path information associated with the egress PFE in forwarding information of the source virtual routing node; and
   sending, by the source virtual routing node, a next packet directly to the egress PFE instead of load balancing the next packet.

2. The method of claim 1, further comprising:
   determining whether fabric path information associated with an egress PFE of the plurality of PFEs is known; and
   sending the modified packet to the receiving PFE of the plurality of PFEs if the fabric path information is not known.

3. The method of claim 1, wherein the modified packet comprises:
   a hash value associated with a source PFE of the source virtual routing node; and
   the information associated with the source PFE.

4. The method of claim 1, wherein the fabric path header is based on Institute of Electrical and Electronics Engineers 802.1BR standard.

5. The method of claim 1, wherein determining whether the packet includes a high packet rate comprises:
   counting a number of shorter prefix matches occurring within a period of time; and
   determining that the number of shorter prefix matches exceeds a defined threshold.

6. The method of claim 1, wherein receiving the fabric path information associated with the egress PFE comprises:
   receiving a hash value associated with the egress PFE.

7. The method of claim 6, wherein the hash value associated with the egress PFE includes a longest prefix.

8. The method of claim 1, wherein determining whether fabric path information associated with an egress PFE of the plurality of PFEs is known comprises:
   determining whether the packet matches a longest prefix.

9. The method of claim 1, further comprising:
   receiving, by a receiving virtual routing node of a single-chassis network device having a plurality of packet forwarding engines (PFEs) and a plurality of fabric links coupling respective pairs of the plurality of PFEs at respective fabric interfaces of the plurality of PFEs, a modified packet from a source virtual routing node, wherein the modified packet includes the fabric path header to request fabric path information associated with the egress PFE;
   determining, by the receiving virtual routing node, that the modified packet includes the header;
   retrieving, by the receiving virtual routing node and from forwarding information of the receiving virtual routing node, the fabric path information associated with the egress PFE; and
   sending, by the receiving virtual routing node, the fabric path information associated with the egress PFE to the path module instead of forwarding the modified packet to a next fabric hop.

10. The method of claim 9, wherein the fabric path information associated with the egress PFE comprises:
    information associated with the egress PFE;
    a hash value associated with a source PFE of the source virtual routing node; and
    information associated with the source PFE.

11. A single-chassis network device comprising:
    a plurality of packet forwarding engines (PFEs);
    a plurality of fabric links coupling respective pairs of the plurality of PFEs at respective fabric interfaces of the plurality of PFEs;
    a first virtual routing node and a second virtual routing node of a plurality of virtual routing nodes, wherein the first virtual routing node is configured to:
    receive a packet;
    determine whether the packet has a high packet rate;

in response to determining that the packet has the high packet rate, send a modified packet to a receiving PFE of the plurality of PFEs, wherein the modified packet is the packet with the high packet rate that is modified to include a fabric path header to request fabric path information associated with the egress PFE;

receive the fabric path information associated with the egress PFE from a path module;

store the fabric path information associated with the egress PFE in forwarding information of the first virtual routing node; and send a next packet directly to the egress PFE instead of load balancing the next packet.

12. The single-chassis network device of claim 11, wherein the first virtual routing node is further configured to:
determine whether fabric path information associated with an egress PFE of the plurality of PFEs is known; and
send the modified packet to the receiving PFE of the plurality of PFEs if the fabric path information is not known.

13. The single-chassis network device of claim 11, wherein, to send the modified packet, the first virtual routing node further configured to:
send a hash value associated with a source PFE of the first virtual routing node and the information associated with the source PFE.

14. The single-chassis network device of claim 11, wherein the fabric path header is based on Institute of Electrical and Electronics Engineers 802.1BR standard.

15. The single-chassis network device of claim 11, further comprising:
a counter to count a number of shorter prefix matches occurring within a period of time,
wherein, to determine whether the packet includes a high packet rate, the first virtual routing node configured to:
determine that the number of shorter prefix matches exceeds a defined threshold.

16. The single-chassis network device of claim 11, wherein, to receive the fabric path information associated with the egress PFE, the first virtual routing node configured to:
receive a hash value associated with the egress PFE.

17. The single-chassis network device of claim 16, wherein the hash value associated with the egress PFE includes a longest prefix.

18. The single-chassis network device of claim 12, wherein, to determine whether fabric path information associated with an egress PFE of the plurality of PFEs is known, the first virtual routing node configured to:
determine whether the packet matches a longest prefix.

19. The single-chassis network device of claim 11, wherein the second virtual routing node of the plurality of virtual routing nodes is configured to:
receive a modified packet from the first virtual routing node, wherein the modified packet includes the fabric path header to request fabric path information associated with the egress PFE;
determine that the modified packet includes the header;
retrieve the fabric path information associated with the egress PFE from forwarding information of the second virtual routing node; and
send the fabric path information associated with the egress PFE to the path module instead of forwarding the modified packet to a next fabric hop.

20. The single-chassis network device of claim 19, wherein, to send the fabric path information associated with the egress PFE to the path module, the second virtual routing node configured to:
send information associated with the egress PFE, a hash value associated with a source PFE of the first virtual routing node, and information associated with the source PFE.

* * * * *